United States Patent
Gummadi et al.

(10) Patent No.: US 10,944,907 B2
(45) Date of Patent: Mar. 9, 2021

(54) GENERATING AN IMAGE USING AUTOMATIC MODE SETTINGS WHILE IN MANUAL MODE

(71) Applicant: QUALCOMM Incorporated, San Diego, CA (US)

(72) Inventors: Bapineedu Chowdary Gummadi, Hyderabad (IN); Soman Ganesh Nikhara, Hyderabad (IN); Pradeep Kumar Veeramalla, Hyderabad (IN); Ravi Shankar Kadambala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/840,520

(22) Filed: Dec. 13, 2017

(65) Prior Publication Data
US 2019/0182423 A1 Jun. 13, 2019

(51) Int. Cl.
| | |
|---|---|
| *H04N 5/232* | (2006.01) |
| *H04N 5/262* | (2006.01) |
| *G06T 5/50* | (2006.01) |
| *G06T 5/00* | (2006.01) |

(52) U.S. Cl.
CPC ..... *H04N 5/23245* (2013.01); *H04N 5/23216* (2013.01); *H04N 5/23225* (2013.01); *H04N 5/23229* (2013.01); *H04N 5/23293* (2013.01); *H04N 5/23296* (2013.01); *H04N 5/232933* (2018.08); *H04N 5/232935* (2018.08); *H04N 5/2621* (2013.01); *G06T 5/007* (2013.01); *G06T 5/50* (2013.01); *H04N 5/23222* (2013.01)

(58) Field of Classification Search
CPC .......... H04N 5/23245; H04N 5/23293; H04N 5/23296; H04N 5/23225; H04N 5/23222; G06T 5/007; G06T 5/50
See application file for complete search history.

(56) References Cited

U.S. PATENT DOCUMENTS

| | | | |
|---|---|---|---|
| 8,991,809 B2 | 3/2015 | Tanonaka | |
| 2006/0038894 A1 * | 2/2006 | Chan | H04N 5/232 348/222.1 |
| 2007/0140675 A1 | 6/2007 | Yanagi | |

(Continued)

FOREIGN PATENT DOCUMENTS

| | | | | |
|---|---|---|---|---|
| EP | 2131573 A1 * | 12/2009 | | H04N 5/23219 |
| JP | 2002158903 A | 5/2002 | | |

(Continued)

OTHER PUBLICATIONS

International Search Report and Written Opinion—PCT/US2018/065426—ISA/EPO—dated Mar. 21, 2019.

*Primary Examiner* — Nhan T Tran
(74) *Attorney, Agent, or Firm* — Polsinelli LLP

(57) ABSTRACT

Methods and devices are described for image or video capture while in a manual mode. In some aspects, a device includes one or more processors. The device also includes a memory coupled to the one or more processors. The memory includes instructions that, when executed by the one or more processors, causes the device to generate a first image frame of a scene using manual mode settings and generate a second image frame of the scene using automatic mode settings different from the manual mode settings.

23 Claims, 12 Drawing Sheets

(56) References Cited

U.S. PATENT DOCUMENTS

| | | |
|---|---|---|
| 2012/0092515 A1 | 4/2012 | Yim et al. |
| 2012/0268641 A1 | 10/2012 | Kazama |
| 2014/0300809 A1* | 10/2014 | Oliveira ............... H04N 5/2254 |
| | | 348/376 |
| 2015/0054985 A1 | 2/2015 | Baek et al. |
| 2016/0028939 A1 | 1/2016 | Ogawa |
| 2016/0073015 A1 | 3/2016 | Bressler |

FOREIGN PATENT DOCUMENTS

| | | |
|---|---|---|
| JP | 2007274581 A | 10/2007 |
| WO | WO-2016008127 A1 | 1/2016 |

* cited by examiner

US 10,944,907 B2

GENERATING AN IMAGE USING AUTOMATIC MODE SETTINGS WHILE IN MANUAL MODE

TECHNICAL FIELD

The present disclosure relates generally to controlling cameras, and specifically to generating one or more images using automatic mode settings while in a manual mode.

BACKGROUND

Many electronic devices, such as smartphones, tablets, home security systems, automobiles, drones, and aircrafts, use one or more cameras to capture images and video. Each of the one or more cameras is initialized prior to use, for example, by determining one or more initial settings for capturing images. Additionally, a controller or one or more processors may use one or more initial settings for processing images. Devices may have an automatic mode during which initial capture settings and initial processing settings are automatically determined, and may also have a manual mode during which one or more of the initial settings may be manually set by a user.

During the manual mode, the user may set initial capture settings or initial processing settings that cause the device to capture a lower-quality image than would have been captured using the automatically determined initial settings. It is desirable to improve the quality of images generated by a device when operating in such a manual mode.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to methods and devices for generating one or more images using automatic mode settings while operating in a manual mode. In some aspects, a device is disclosed that includes a memory coupled to one or more processors. The memory includes instructions that, when executed by the one or more processors, causes the device to generate a first image frame of a scene using manual mode settings and generate a second image frame of the scene using automatic mode settings different from the manual mode settings.

In another aspect, a method is disclosed for generating one or more images using automatic mode settings while operating in a manual mode. The method includes generating a first image frame of a scene using manual mode settings, and generating a second image frame of the scene using automatic mode settings different from the manual mode settings.

In another aspect, a non-transitory computer-readable storage medium is disclosed. The non-transitory computer-readable storage medium may store one or more programs containing instructions that, when executed by one or more processors of a device operating in a manual mode, cause the device to perform a number of operations. The number of operations may include generating a first image frame of a scene using manual mode settings and generating a second image frame of the scene using automatic mode settings different from the manual mode settings.

In another aspect, a device is disclosed. The device may include means for means for generating a first image frame of a scene using manual mode settings and means for generating a second image frame of the scene using automatic mode settings different from the manual mode settings.

BRIEF DESCRIPTION OF THE DRAWINGS

Aspects of this disclosure are illustrated by way of example, and not by way of limitation, in the figures of the accompanying drawings and in which like reference numerals refer to similar elements.

DETAILED DESCRIPTION

Figure 1:
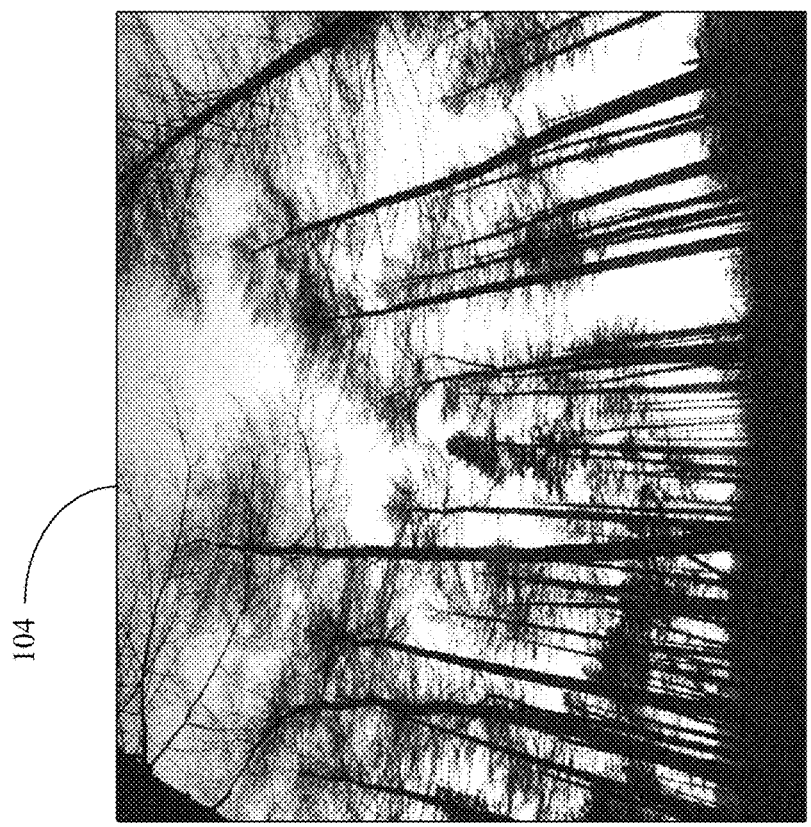
FIG. 1 depicts an example generated image of a scene using an exposure value manually set in a manual mode alongside an example generated image of the same scene using an exposure value automatically set in an automatic mode.
Figure 1:
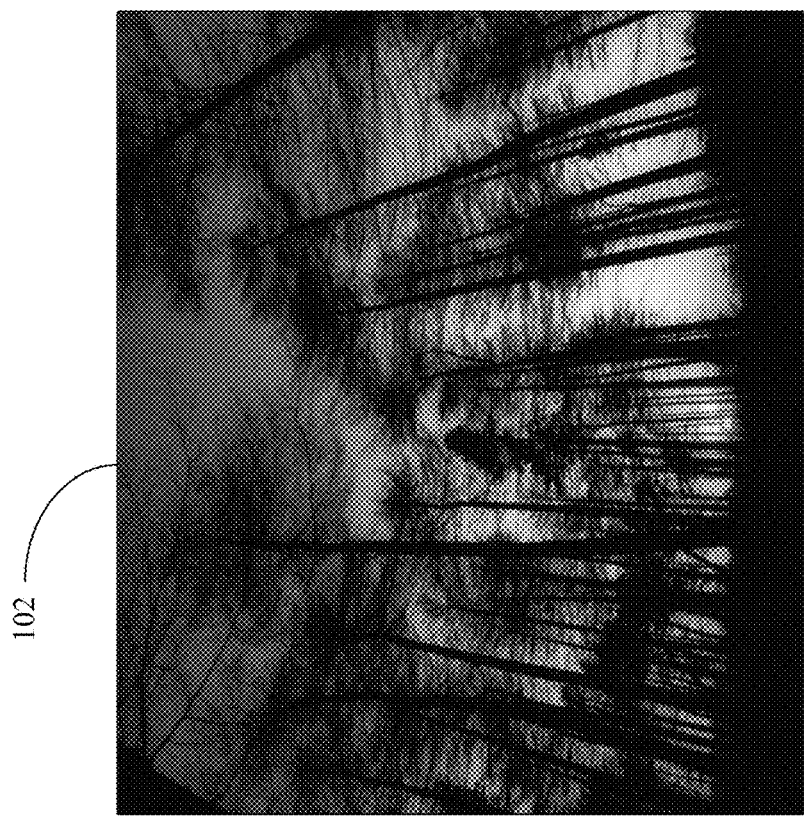

Aspects of the present disclosure may allow a device to generate one or more images using automatic mode settings while in a manual mode, and may be applicable to any device having or coupled to one or more cameras (such as a consumer device with a camera or with a dual camera module). In the following description, settings for generating a camera image include capture settings and processing settings. Capture settings are settings for configuring a camera to capture an image or settings that otherwise affect the capture of an image. Camera features or device features that may affect the capture of an image include, but are not limited to, a camera sensor sensitivity, a camera shutter speed, a camera aperture size, a camera lens focal length, and a light source (such as a flash). One or more of the features may be adjustable by the device and the user. Example capture settings that adjust the camera or device features affecting the capture of an image include, but are not limited to, an ISO setting, camera shutter setting, aperture size setting, an optical zoom setting, and various flash settings (such as whether the flash is active, flash brightness, flash duration, and flash color). Devices with multiple cameras may also have an adjustable depth of field setting.

An ISO setting value may indicate the sensitivity of the camera sensor, with a higher value indicating higher sensitivity for the camera sensor. A camera shutter setting may indicate a number of images that can be captured in a second, the amount of time before closing the camera shutter, or some other measurement of time indicating the amount of time the camera sensor is exposed for receiving light through the camera aperture. A camera aperture size setting may be a number or value to indicate the size of the aperture. The value may indicate a specific size of the aperture or indicate the size of the aperture relative to the size of the camera sensor.

For an optical zoom setting, a camera focal length may indicate the distance from the camera lens to where light is focused after passing through the camera lens. With a camera lens having a fixed curvature, objects further from the camera come into focus for an image and increase in size in an image as the camera lens moves away from the camera sensor. An optical zoom setting may thus indicate a change in the camera focal length. The setting value may be a multiple of a baseline focal length (such as 2×, 4×, and so on).

A device may also include a flash to provide light for low-light environments. Some settings that may be adjustable include, but are not limited to, the brightness of the flash, the duration of the flash, whether the flash strobes or is steady, and the light color for the flash.

Alternative or in addition to an ISO setting, camera shutter setting, and aperture size setting, an exposure value setting may be used to adjust one or more of the camera sensor sensitivity, the camera shutter speed, and the camera aperture size. For example, the aperture size may be fixed, and an exposure value setting is used for adjusting the camera sensor sensitivity and the shutter speed. Exposure values may be expressed in terms of f-values or stops, and may be measured as an amount of brightness for a unit of area (such as in units of candelas per square feet ($cd/ft^2$) or candelas per square meter ($cd/m^2$)). One stop above or more refers to a doubling of the amount of light received by a camera sensor (such as $2*x$ $cd/ft^2$), and one stop below or less refers to a halving of the amount of light received by the camera sensor (such as $x/2$ $cd/ft^2$).

A depth of field setting indicates a range of depth for which the closest depth from the camera and the furthest depth from the camera are in focus. A greater value indicates a larger range of depth that appears in focus for an image. If capturing an image using multiple cameras, the depths of field for the multiple cameras may be used to adjust the depth of field for a resulting image. For example, is a user requests a specific depth of field greater than one camera's depth of field, different cameras may use different focal lengths for capturing multiple images. With each image having a depth of field for a focal length, the captured images may be blended for the final image to appear to have a depth of field greater than for one camera. Adjusting a depth of field may also include adjusting processing the captured images. Processing settings are discussed in more detail below.

After using capture settings to capture an image, a device may use processing settings to process the captured image and generate the final image. One or more processing settings may be determined or adjusted by a device or a user, and an image signal processor may use the processing settings to generate the final image. Example processing settings that may be adjustable include a white or color balance setting, a gamma correction setting, a noise reduction setting, a digital zoom setting, and an image sharpening (edge enhancement) setting. Another example processing setting may be a depth of field setting (as previously described).

A white balance setting may indicate how to compensate for the color of the lighting in a scene. For example, if the lighting for a captured image is a cool color temperature (such as a bluish tint that may be provided by fluorescent lights or a device flash), a device may use the white balance setting to adjust the color in the captured image so that the final image appears to include warmer color temperature lighting. A white balance setting may also be used to tint or color the captured image during processing. In addition to a device using a white balance setting to adjust the color temperature for an image, a device may adjust the color temperature of the flash if a flash is used.

A gamma correction setting (or gamma setting) may indicate how much to encode a brightness of a captured image when generating a final image. For example, a change in gamma correction may cause a final image to be darker or lighter. For example, an increase in a gamma correction setting may cause shadows in a generated image to appear darker. Conversely, a decrease in a gamma correction setting may cause shadows in a generated image to appear lighter. In some examples, a correction setting may be a value, with greater than one indicating a decrease in apparent brightness, and less than one indicating an increase in apparent brightness.

A noise reduction setting may be used to remove noise in a captured image. An ISO setting or exposure value setting may be increased for capturing an image in lower light settings. As a result, the captured image may include more pixels with noise dispersed in the image. The captured image may therefore appear to have snow or static from the noise. An image signal processor may reduce noise by reducing the intensity of the pixels with noise. For example, the image signal processor may apply a mask to each pixel of a captured image to average the neighboring pixel intensities. As a result, the pixel intensity for noise may be replaced with an averaged pixel intensity. Such a mask may cause blurring, and many noise reduction filters are called blurring filters. A noise reduction setting may indicate, e.g., the size of a mask for averaging, the weights for the positions in the mask for weighted averaging, or the type of noise reduction filter to be used. An example noise reduction filter is a bilateral filter, and the noise reduction setting may be one or more smoothing parameters to be applied for the noise reduction filter. As a result, a change in a noise reduction setting may increase or decrease the amount of blurring of a captured image, and determining a noise reduction setting may be balanced between blurring the captured image and removing noise from the captured image.

A digital zoom setting, as compared to an optical zoom setting, indicates a zoom to be applied in processing a captured image for a fixed optical zoom. For example, an image may be captured at a specific focal length, and an image signal processor may process the captured image so that the generated image is zoomed in on a portion of the captured image. A digital zoom setting may allow a user to zoom in on an object if the camera lens is fixed, or may allow a user to zoom in on an object past a maximum optical zoom setting for the camera. For example, an image signal processor may crop a portion of the captured image, and expand the cropped portion to fill the same size as the captured image. Adjusting contrast, edge enhancement, and other filtering may be performed for the digital zoom to compensate for less capture information being used to generate an image. For example, when zooming in on an object using a digital zoom, the edges of the object may appear blurred. As a result, an edge enhancement filter may adjust the contrast or rate of contrast in intensity of an edge. In adjusting the rate of contrast, the edge enhancement filter may adjust the size or thickness of an edge.

An edge enhancement or image sharpening setting may indicate an increase or decrease in a rate of contrast between intensities. For example, the setting may be used to identify edges to be sharpened, and may be used to determine how much to sharpen an identified edge. If a captured image is blurred by a noise reduction filter, an edge enhancement filter may be used to reconstruct edges that are blurred.

A device is not required to use all of the described settings, and a device may use other settings not described. Therefore, while some example capture settings and processing settings are provided, other capture settings or processing settings may exist, and the present disclosure should not be limited to any specific group of capture or processing settings.

A device may be configured to allow a user to determine one or more of the capture settings and processing settings in a manual mode, and the device may automatically determine settings not determined by the user in the manual mode. The device may use the manually determined settings by a user, and use automatically determined or predefined values for the settings not determined by a user, to capture and process an image. For a manual mode, a device may include a graphical user interface to show different values that a user can select for a capture setting or processing setting. In one example, if a user is to adjust the exposure value setting, the user may go to a menu for the exposure value and select a stop to be used for capturing the image. The user may then proceed through other menus of the graphical user interface to determine or adjust one or more other settings (such as color balance, zoom, flash, and so on), and the device automatically determines any remaining capture or processing settings not determined by the user. In another example, a user may select a scene type, with the device including different camera and/or processing settings corresponding to the selected scene type. The device then uses the corresponding settings to capture and process an image.

Alternatively, a device may automatically determine all of the capture settings and processing settings in an automatic mode. For example, when a user opens a camera application on a smartphone, or when a user places a digital camera into an automatic mode, the device determines the settings for capturing and processing the image without additional input from the user.

When one or more settings for capturing or processing an image is manually set by a user when the device is in the manual mode, the manual settings selected by the user may result in a less desirable image than would have been generated using settings automatically determined by the device in an automatic mode. For example, before capturing an image, a user may use one or more device menus to manually set an exposure value (which may include setting the camera aperture size, the camera sensor sensitivity, and/or the camera shutter speed) that is lower than the exposure value that would have been automatically determined by the device. For dark or low lighting scenes (such as at sunrise, at sunset, at twilight, while indoors, or other dimly lit scenes), the lower exposure value manually selected by the user may cause the camera to capture less light and thereby generate a less desirable image (such as with less scene detail) than would have been generated using an exposure value automatically determined by the device in the automatic mode.

In some example implementations, a device may capture and/or process an image using automatic mode settings and capture and/or process another image using manual mode settings. In this manner, if the image captured and/or processed using the manual mode settings is less desirable than an image captured and/or processed using the automatic mode settings, a user still has the ability save or keep the image for the automatic mode settings. If the device processes two images using manual mode settings and automatic mode settings, the device may generate two images, and both images may be used or stored, or the user may select one of the images for use or storage (and thus discarding the other image). A user may determine capture and processing settings before capturing an image. Alternatively, the device may be configured to allow a user to determine one or more processing settings after capture. For example, the user may preview the captured image while adjusting a blurring or noise removal setting until the user determines a desired setting. The device then processes the captured image using the processing settings to generate a final image.

FIG. 1 depicts an example generated image 102 of a scene using an exposure value manually selected by a user when the device is in a manual mode alongside an example generated image 104 of the same scene using an exposure value automatically selected by the device in an automatic mode. As shown in FIG. 1, the manually selected exposure value may cause the image 102 to include less detail of the scene than the image 104, for example, such that the user may prefer the image 104 generated when the device is in the automatic mode over the image 102 generated when the device is in the manual mode. In some example implementations, when a device is in a manual mode (such as for capturing and processing image 102), another image may be generated using the automatic mode settings (such as for capturing and processing image 104). The manual-mode image and the automatic-mode image may both be stored by the device, or alternatively, a user may be presented with both the manual-mode image and the automatic-mode image and prompted to select which of the images (one or both) are to be stored by the device.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable device (such as smartphones, tablets, laptop computers, digital cameras, web cameras, a security system, automobiles, drones, aircraft, and so on) having or coupled to one or more cameras. For multiple cameras, the cameras may include a primary camera and one or more auxiliary cameras with similar capabilities as the primary camera. For example, a device may include a dual camera module with two cameras. The camera(s) may be able to capture and process still images or video. While described below with respect to capturing and processing images, aspects of the present disclosure are applicable to capturing and processing video, and are therefore not limited to still images.

Figure 2A:
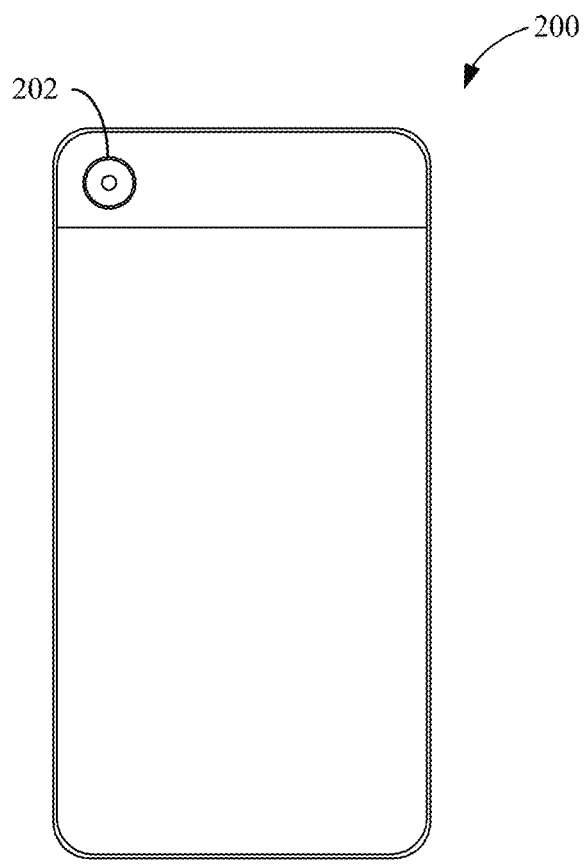
FIG. 2A depicts an example device including a camera.
Figure 2B:
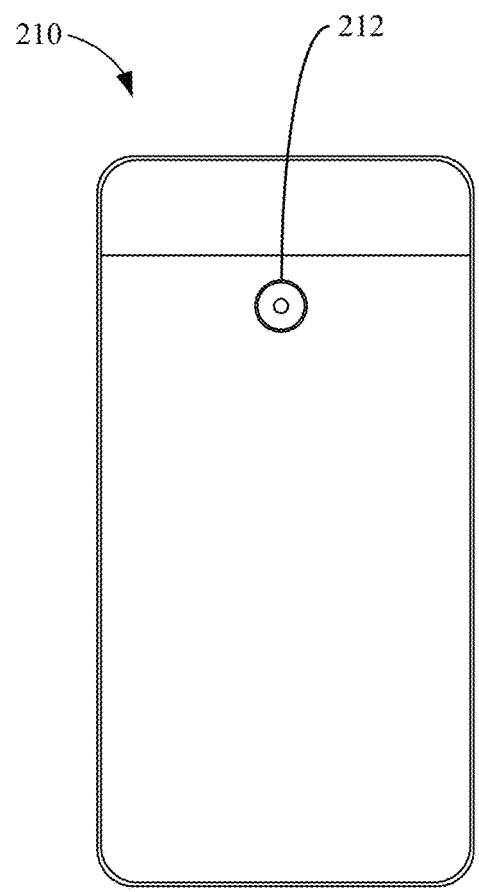
FIG. 2B depicts another example device including a camera.
Figure 3A:
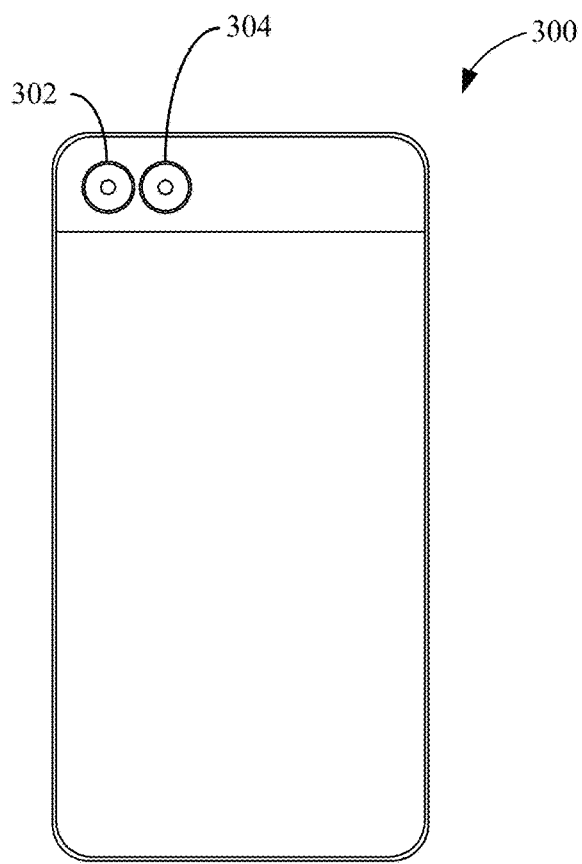
FIG. 3A depicts an example device including multiple cameras.
Figure 3B:
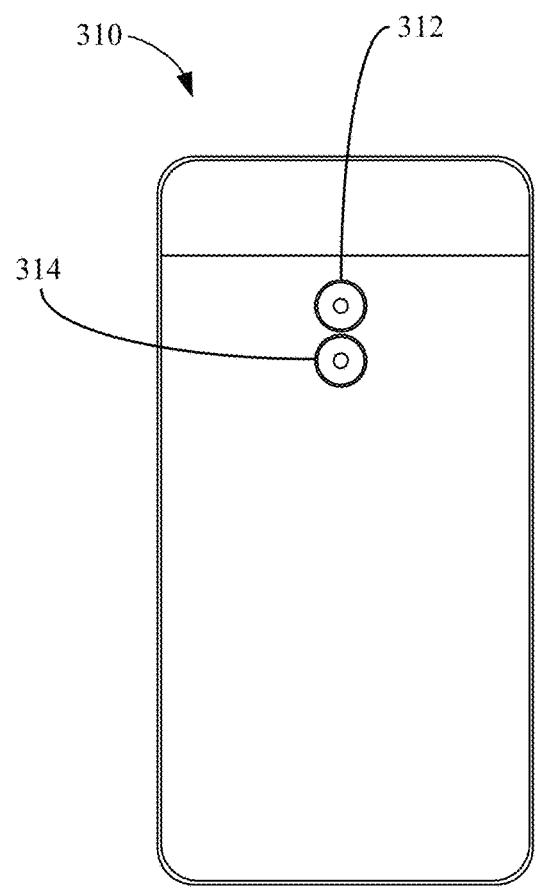
FIG. 3B depicts another example device including multiple cameras.

FIG. 2A depicts an example device 200 including a camera 202 arranged in a first configuration, and FIG. 2B depicts an example device 210 including a camera 212 arranged in a second configuration. FIG. 3A depicts an example device 300 including a dual camera with a first camera 302 and a second camera 304 arranged in a first configuration, and FIG. 3B depicts an example device 310 including a dual camera with a first camera 312 and a second camera 314 arranged in a second configuration. In some aspects, one of the cameras (such as the first cameras 302 and 312 of respective devices 300 and 310) may be a primary camera, and the other of the cameras (such as the second cameras 304 and 314 respective devices 300 and 310) may be an auxiliary camera. The second cameras 304 and 314 may have the same characteristics and capabilities (such as the same focal length, same capture rate, same resolution, same color palette, and the same field of view or capture) as the first cameras 302 and 312, respectively. Alternatively, the second cameras 304 and 314 may have different characteristics and abilities than the first cameras 302 and 312, respectively. Any configuration of cameras may be used, and the disclosure should not be limited to the illustrated examples in FIGS. 2A-3B.

The term "device" is not limited to one or a specific number of physical objects (such as one smartphone). As used herein, a device may be any electronic device with multiple parts that may implement at least some portions of this disclosure. In one example, a device may be a video security system including one or more hubs and one or more separate cameras. In another example, a device may be a smartphone including two cameras such as, for example, the example devices 300 and 310 of FIGS. 3A and 3B, respectively. While the below description and examples use the term "device" to describe various aspects of this disclosure, the term "device" is not limited to a specific configuration, type, or number of objects.

Figure 4:
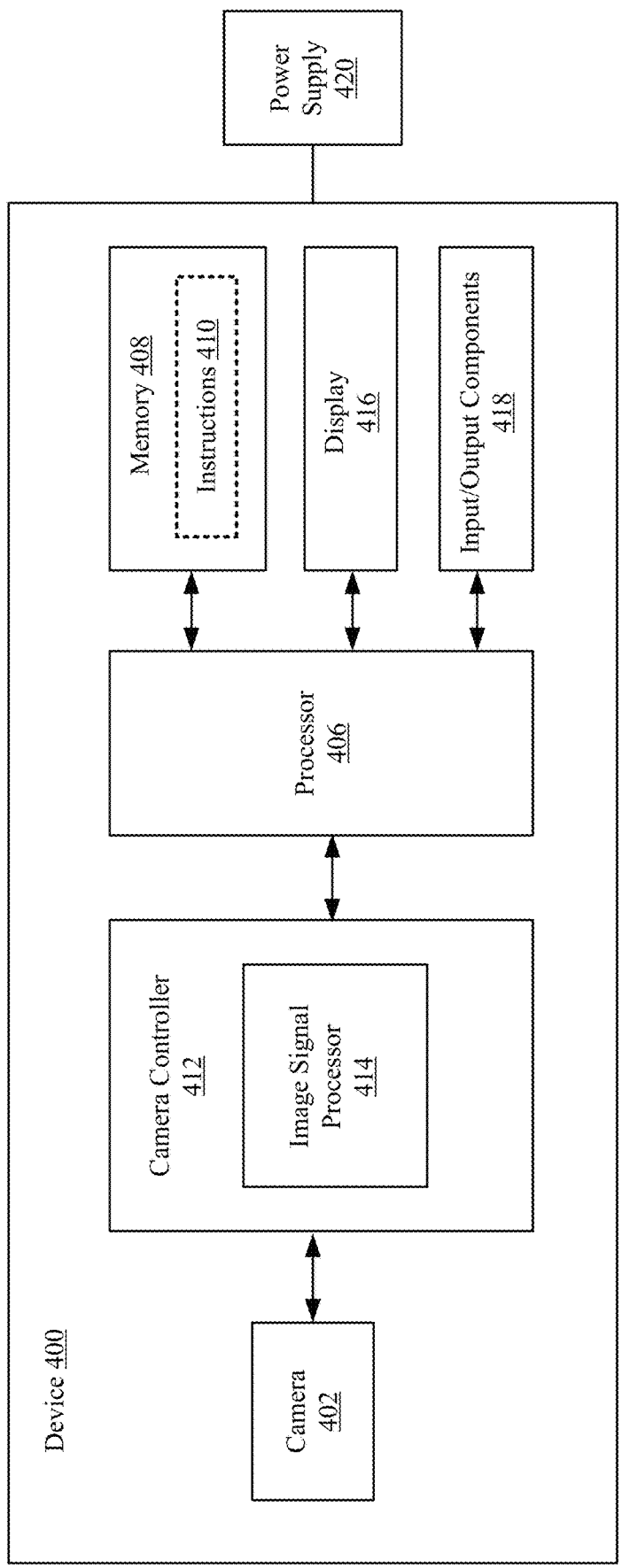
FIG. 4 is a block diagram of an example device including a camera.

FIG. 4 is a block diagram of an example device 400 including a camera 402. The example device 400, which may be one implementation of the devices 200 and 210 of FIGS. 2A and 2B, may be any suitable device capable of capturing images or video including, for example, wired and wireless communication devices (such as camera phones, smartphones, tablets, security systems, dash cameras, laptop computers, desktop computers, automobiles, drones, aircraft, and so on), digital cameras (including still cameras, video cameras, and so on), or any other suitable device. The example device 400 is shown in FIG. 4 to include a camera 402, a processor 406, a memory 408 storing instructions 410, a camera controller 412, a display 416, and a number of input/output (I/O) components 418. The device 400 may include additional features or components not shown. For example, a wireless interface, which may include a number of transceivers and a baseband processor, may be included for a wireless communication device.

The camera 402 may be capable of capturing individual image frames (such as still images) and/or capturing video (such as a succession of captured image frames). The camera 402 may also include one or more image sensors (not shown for simplicity) and shutters for capturing an image frame and providing the captured image frame to the camera controller 412.

The memory 408 may be a non-transient or non-transitory computer readable medium storing computer-executable instructions 410 to perform all or a portion of one or more operations described in this disclosure. The device 400 may also include a power supply 420, which may be coupled to or integrated into the device 400.

The processor 406 may be one or more suitable processors capable of executing scripts or instructions of one or more software programs (such as the instructions 410)

stored within the memory 408. In some aspects, the processor 406 may be one or more general purpose processors that execute the instructions 410 to cause the device 400 to perform any number of functions or operations. In additional or alternative aspects, the processor 406 may include integrated circuits or other hardware to perform functions or operations without the use of software. While shown to be coupled to each other via the processor 406 in the example of FIG. 4, the processor 406, the memory 408, the camera controller 412, the display 416, and the I/O components 418 may be coupled to one another in various arrangements. For example, the processor 406, the memory 408, the camera controller 412, the display 416, and/or the I/O components 418 may be coupled to each other via one or more local buses (not shown for simplicity).

The display 416 may be any suitable display or screen allowing for user interaction and/or to present items (such as captured images and video) for viewing by the user. In some aspects, the display 416 may be a touch-sensitive display. The I/O components 418 may be or include any suitable mechanism or interface to receive input (such as commands) from the user and to provide output to the user. For example, the I/O components 418 may include (but are not limited to) a graphical user interface, keyboard, mouse, microphone and speakers, and so on.

The camera controller 412 may include an image signal processor 414, which may be (or may include) one or more image signal processors to process captured image frames or video provided by the camera 402. In some example implementations, the camera controller 412 (such as the image signal processor 414) may control operation of the camera 402. In some aspects, the image signal processor 414 may execute instructions from a memory (such as the instructions 410 stored in the memory 408 or instructions stored in a separate memory coupled to the image signal processor 414) to control operation of the camera 402. In other aspects, the image signal processor 414 may include specific hardware to control operation of the camera 402. The image signal processor 414 may alternatively or additionally include a combination of specific hardware and the ability to execute software instructions.

Prior to capturing image frames or video, the device 400 may determine initial capture settings for the camera 402. If the device 400 is in a manual mode for capturing images, the user may manually set one or more of the capture settings, and the device 400 uses the camera 402 to capture an image using the one or more manual settings selected by the user (with any other settings automatically determined by the device 400) for the manual mode. The device 400 may use the camera 402 to also capture an image using automatically determined capture settings associated with the unselected automatic mode. When using one camera (such as the camera 402) to capture multiple images for the different modes, the camera may capture the images in sequence. In one example, the camera 402 may capture a first image using the automatic mode capture settings, and then the camera 402 may capture a second image using the manual mode capture settings. In another example, the camera 402 may capture a first image using the manual mode capture settings, and then the camera 402 may capture a second image using the automatic mode capture settings. The images may be captured in quick succession to reduce possible global or local motion, or to reduce other changes in the scene between image captures. For example, the device 400 may attempt to adjust multiple settings concurrently to reduce the amount of time before capturing the next image.

Additional or alternative to the device 400 determining capture settings, the device 400 may determine processing settings for processing the image after capture. For example, the device 400 determines processing settings to be used by the camera controller 412 (such as by the image signal processor 414) in an automatic mode. In a manual mode, a user may set one or more of the processing settings to be used by the camera controller 412 (such as by the image signal processor 414). If the capture settings are the same between a manual mode and an automatic mode, the camera 402 may capture one image, and the camera controller may then process multiple instances of the one image for the different processing settings between an automatic mode and a manual mode. For example, the camera controller 412 may process an image using the manual mode processing settings and may process a copy of the image using automatic mode processing settings. If the capture settings differ between the automatic mode and the manual mode, the device 400 may capture an image using the automatic mode capture settings and may capture an image using the manual mode capture settings. The camera controller 412 may use the automatic mode processing settings to process the image captured using the automatic mode capture settings, and may use the manual mode processing settings to process the image captured using the manual mode processing settings.

The camera controller 412 may process the two images either sequentially or concurrently. For example, a single image signal processor may process the two images sequentially, while separate image signal processors or threads of an image signal processor may process the two images concurrently, by applying denoising filters, edge enhancement filters, and so on.

In some example implementations, a device may include multiple cameras with similar capabilities (such as some dual camera modules for devices). While a device with multiple cameras may use one of the multiple cameras to capture multiple images, in some example implementations, multiple cameras may be used to capture images using different capture settings. For example, one camera may capture an image using the automatic mode capture settings, and a different camera with the same capabilities may capture an image using the manual mode capture settings.

Figure 5:
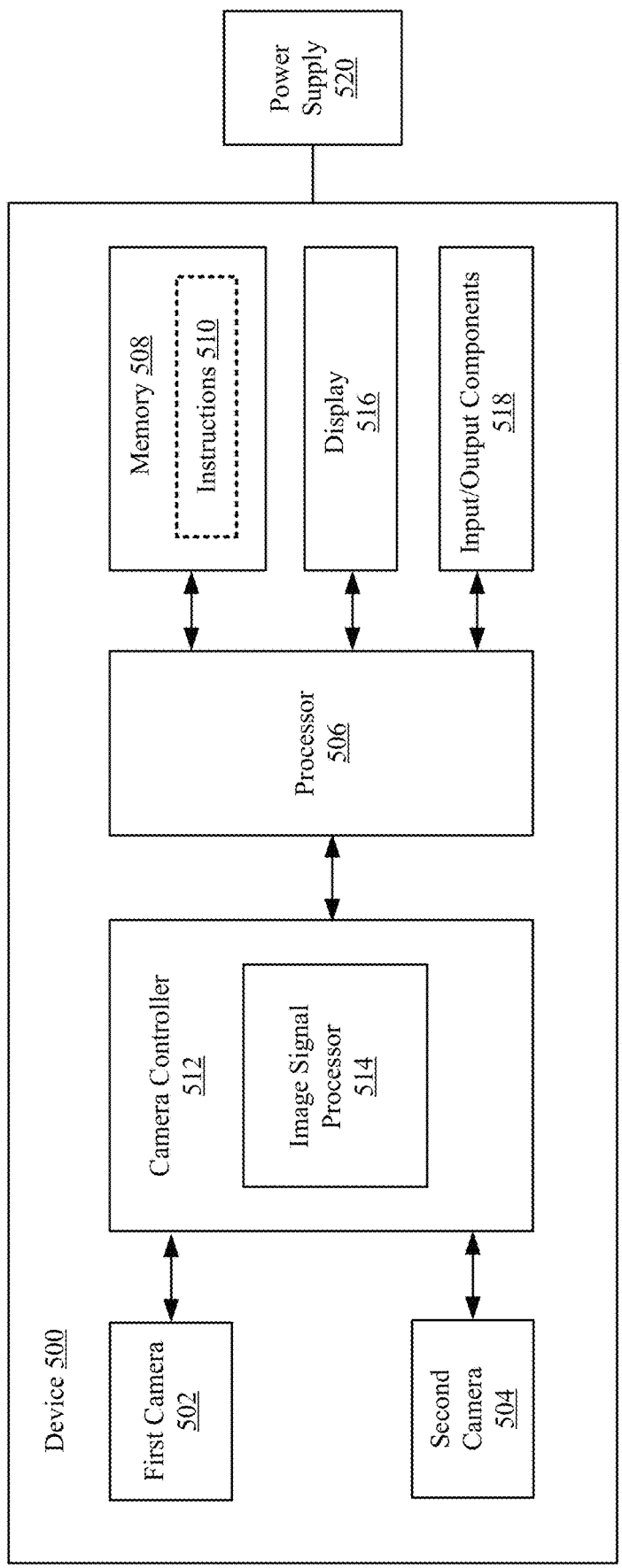
FIG. 5 is a block diagram of an example device including multiple cameras.

FIG. 5 is a block diagram of an example device 500 including a first camera 502 and a second camera 504. The example device 500, which may be one implementation of the devices 300 and 310 of FIGS. 3A and 3B, may be any suitable device capable of capturing images or video. Similar to the device 400 of FIG. 4, the device 500 may include (or be coupled to) a processor 506 (which may be similar to the processor 406), a memory 508 storing instructions 510 (which may be similar to the memory 408 storing the instructions 410), a camera controller 512 (which may include an image signal processor 514 and may be similar to the camera controller 412), a display 516 (which may be similar to the display 416), I/O components 518 (which may be similar to the I/O components 418), and a power supply 520 (which may be similar to the power supply 420).

The camera controller 512 may be configured to control the first camera 502 and the second camera 504. One of the first camera 502 and the second camera 504 may be a primary camera, and the other of the first camera 502 and the second camera 504 may be an auxiliary camera. The primary camera may be used for generating a preview image, which may be displayed on the display 516. In some example implementations, the first camera 502 captures an image using automatic mode capture settings, and the second camera 504 captures an image using manual mode capture settings. The camera controller 512 (such as the image signal processor 514) may then process the two captured images. If the processing settings for the automatic mode and the manual mode differ, the camera controller 512 may separately process the image(s) using the different processing settings.

The image signal processor 514 may be one or more processors, cores, or threads. In one example, the image signal processor 514 may be one processor to process images coming from the first camera 502 and the second camera 504. In another example, the image signal processor 514 may be multiple processors, such as at least two processors where one processor processes images captured by the first camera 502 and another processor processes images captured by the second camera 504. In some example implementations, one processor may be coupled to the first camera 502, and another processor may be coupled to the second camera 504, or a processor may otherwise be dedicated to processing images captured by a specific camera.

Figure 6:
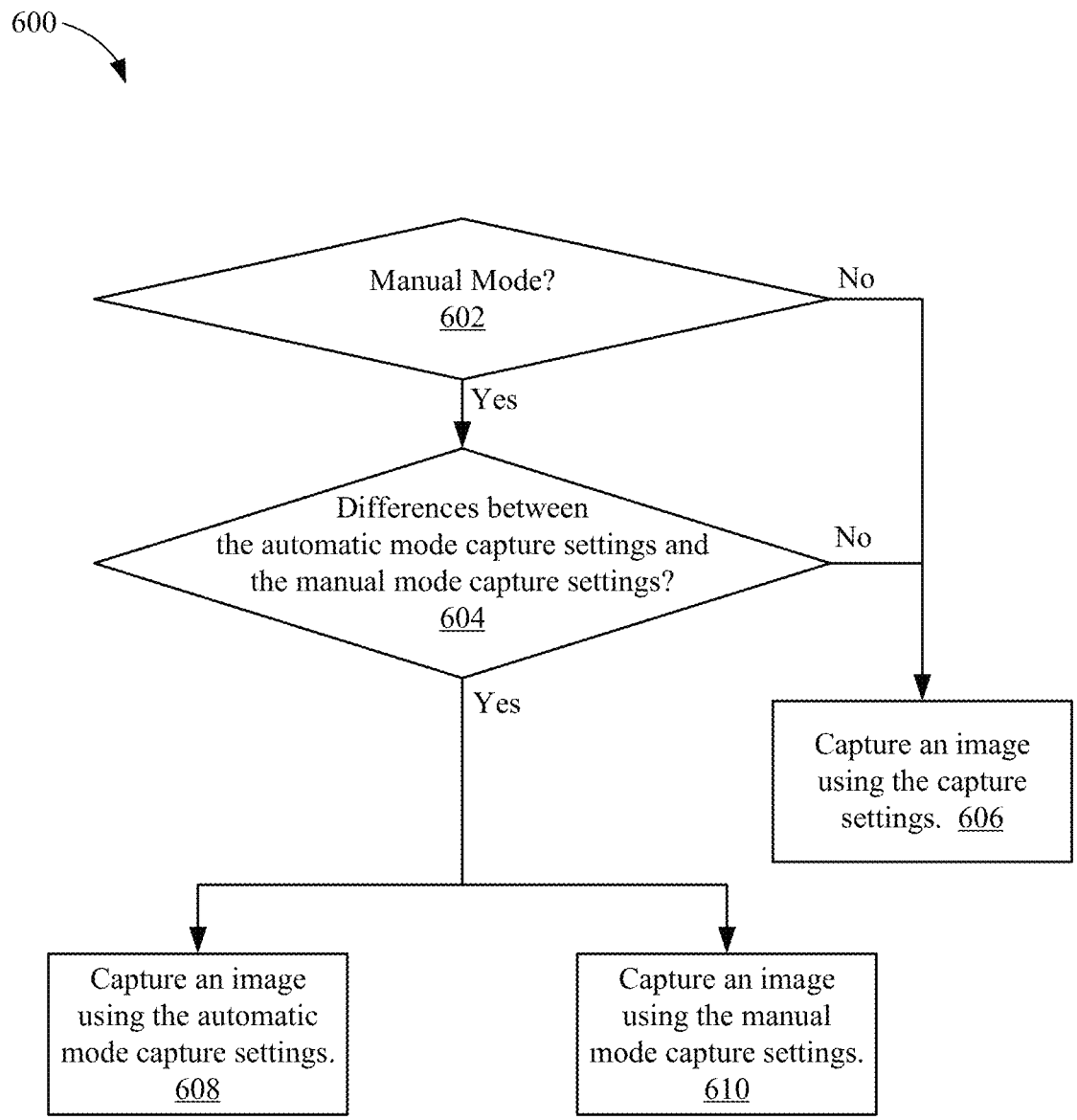
FIG. 6 is an illustrative flow chart depicting an example operation for capturing an image using one or more automatic mode capture settings while in a manual mode.

FIG. 6 is an illustrative flow chart depicting an example operation 600 for a device operating in a manual mode to capture an image using automatic mode capture settings and to capture an image using manual mode capture settings. While capturing and processing images are described in the following examples, it should be understood that aspects of the invention apply to capturing and processing video, and the disclosure should not be limited to the following examples.

If a device (such as the example device 400 of FIG. 4 or the example device 500 of FIG. 5) is not operating in a manual mode (602) or if there are no differences between the automatic mode capture settings and the manual mode capture settings (604), the device may capture an image using the automatic mode capture settings (606). Capturing one or more images may be in response to a user input (such as touching a camera/shutter button, issuing an audible command for capturing an image, squeezing the device to indicate to capture the image, and so on).

In some example implementations, a preview image (or stream) is provided to the user so that the user can preview the image to be captured. For example, if the device 400 or 500 is a smartphone, a user may open a camera application in order for a camera 402 or cameras 502 and 504 to capture one or more images. The user request to open the camera application may cause the device to initialize the one or more cameras, and the device may use a group of initial settings to generate a preview before capturing and processing an image (such as when a user presses a shutter button). The initial settings for a preview may include initial capture settings and initial processing settings. In some example implementations, a preview image is not processed as fully as an image requested to be captured by the user. For example, one or more of a noise reduction setting, a gamma correction setting, edge enhancement setting, and so on may not be applied to a captured image when generating a preview image. Only partially processing a preview image may reduce the processing time and resources. The preview image not be fully processed for generation may impact the preview quality, but the change in preview quality may not be discernable on a device display or the preview image may still be acceptable by the user.

A device may use capture and processing settings from an automatic mode for generating the preview image, even if the device is in a manual mode. When a device first generates a preview, the device may use automatic mode settings to be the initial capture and processing settings. A user may then adjust or replace one or more of the initial settings, placing the device in a manual mode. The preview provided by the device may adjust when adjusting some settings, and the preview may remain the same for other settings.

In some example implementations for capture settings, adjusting an ISO setting, aperture size setting, whether to use a flash, or an optical zoom setting may be reflected in the preview, while adjusting a flash duration or a camera shutter speed setting may not be reflected in the preview. In some example implementations for processing settings, adjusting a white or color balance setting or a digital zoom setting may be reflected in the preview, while adjusting a gamma correction setting, a noise reduction setting, or an edge enhancement setting may not be reflected in the preview. In this manner, processing a preview may not require more time after adjusting the settings, while a preview is still provided to a user before capturing an image.

In some aspects, the device may be able to compare and determine if the automatic mode capture settings (which are determined and used when generating the preview image) are different than the manual mode capture settings. If the automatic mode capture settings are the same as the manual mode capture settings, the device may capture an image using the capture settings that were used to generate the preview image.

If one or more of the automatic mode capture settings are different from the corresponding manual mode capture settings (604), the device may capture an image using the automatic mode capture settings (608), and may also capture an image using the manual mode capture settings (610). While FIG. 6 depicts steps 608 and 610 as being performed in parallel, a device may capture the images either sequentially or concurrently. For example, if one camera (such as the camera 402 of the device 400 of FIG. 4) is used to capture both images, the camera may capture the two images sequentially.

If one or more capture settings are to be manually adjusted, the device may capture an image using the initial settings before adjusting one or more settings and capturing another image. In some example implementations, the device may capture an image using the initial settings before a capture setting that impacts the preview is adjusted. In some other example implementations, the device may capture a first image using the manual mode capture settings (after a user adjusts one or more capture settings). The device may then apply the automatic mode capture settings (before a user adjusts the one or more capture settings) to capture the second image.

For another example, if two cameras (such as the cameras 502 and 504 of the device 500 of FIG. 5) are used to capture both images, the two cameras may capture the two images concurrently. In some example implementations, only one of the cameras captures a preview. In some other example implementations, any camera may capture a preview. The change to one or more capture settings may be applied for a camera capturing the preview in order to adjust the preview. Alternatively, one or more manual mode capture settings may be applied for a camera not capturing a preview so that the preview is not adjusted. In some example implementations where any camera may capture a preview, multiple cameras may be used to capture multiple previews. For example, the device may use one camera to capture a preview using the manual mode capture settings, and the device may use another camera to capture a preview using the automatic mode capture settings.

Figure 11A:
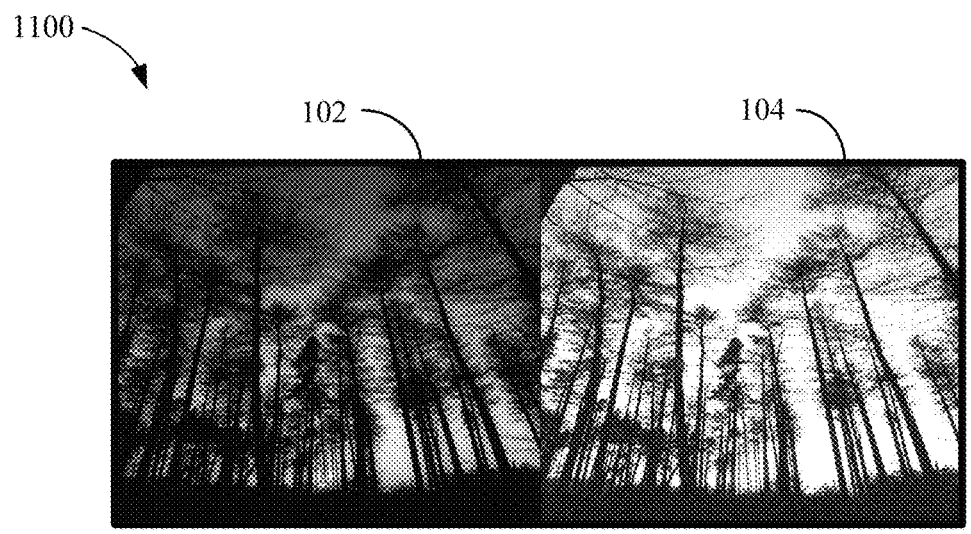
FIG. 11A is an example side-by-side view of multiple previews.

If more than one preview image is generated before capturing an image, a display may be configured to display multiple preview images. For example, the display may present both preview images concurrently (such as a side-by-side view, a picture-in-picture view, and so on), the display may switch between presenting the different preview images (such as using a user input to switch between preview images, including a soft button or physical button, an audible command, squeezing the device, flicking or rotating the device, and so on), or the display may switch between a concurrent view and the separate previews. FIG. 11A is an example side-by-side view 1100 of multiple previews for the image 102 and the image 104 of FIG. 1 before image capture. Different example implementations for a side-by-side view may exist. For example, the dimensions of a display may not allow for both images to be shown in their entirety without letterboxing. In some example implementations, the side-by-side view may include cropping a portion of the preview for image 102 and/or a portion of the preview for image 104, letterboxing the preview for image 102 and/or the preview for image 104, or a combination of both.

Figure 11B:
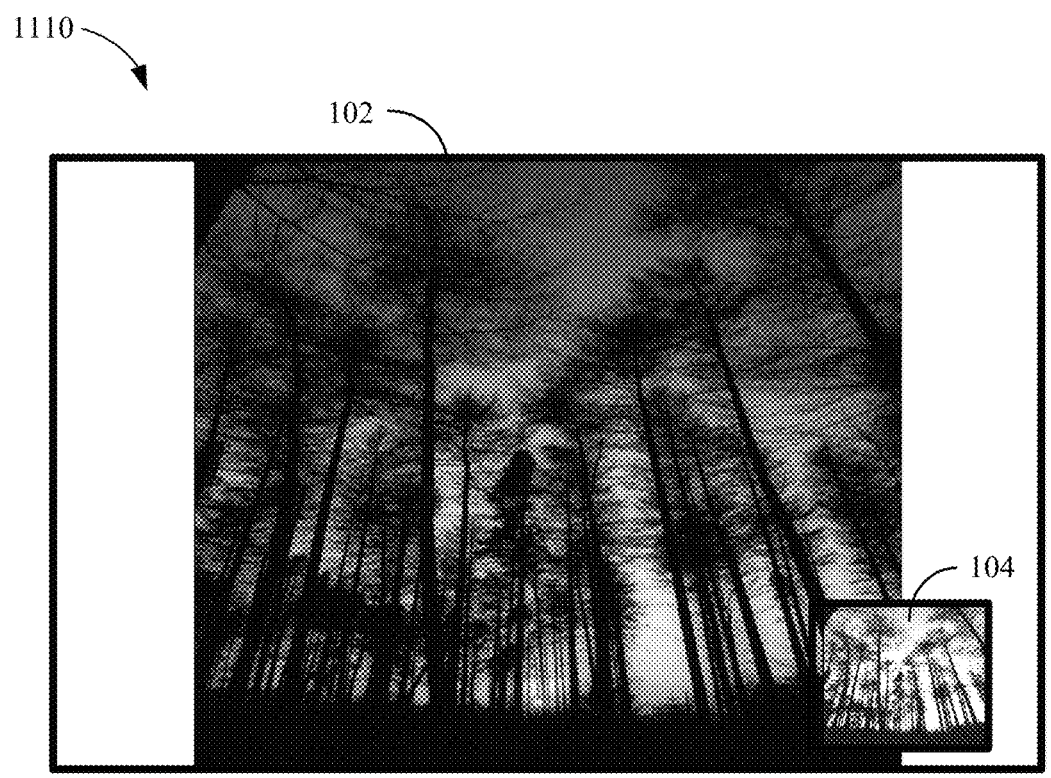
FIG. 11B is an example picture-in-picture view of multiple previews.

FIG. 11B is an example picture-in-picture view 1110 of multiple previews for the image 102 and the image 104 before image capture. Different example implementations for a picture-in-picture view may exist. For example, the preview for image 102 may be cropped to fill the display, the location of the preview for image 104 may be in a different corner of the display (or adjustable by the user), and the size of the preview for image 104 may be larger, smaller, and/or adjustable by the user. In some example implementations, the user may switch between the previews for images 102 and 104 being more prominent in the picture-in-picture view. For example, the user may tap or swipe the preview for image 104, may tap or swipe the display in any location, may squeeze the device, may press a soft button or physical button, may flick or rotate the device, and so on, to switch between the previews for images 102 and 104 being more prominent in the picture-in-picture view.

An auxiliary camera may have different characteristics or capabilities than the primary camera. For example, an auxiliary camera may have a narrower field of view than the primary camera. With the cameras having different fields of view, the primary camera may be used to capture both the image using the automatic mode capture settings and the image using the manual mode capture settings. In some example implementations, the auxiliary camera may still be used to generate the preview image for the manual mode settings. If the auxiliary camera's field of view is narrower that the primary camera's field of view, only a portion of the scene to be captured by the primary camera may exist in the preview image for the manual mode settings. The preview image may assist a user in determining if any of the manual mode settings should be adjusted and in identifying which manual mode settings are to be adjusted. When the image is to be generated using the adjusted manual mode settings, the settings of the primary camera can be adjusted, and the primary camera can be used to capture the image.

Figure 7:
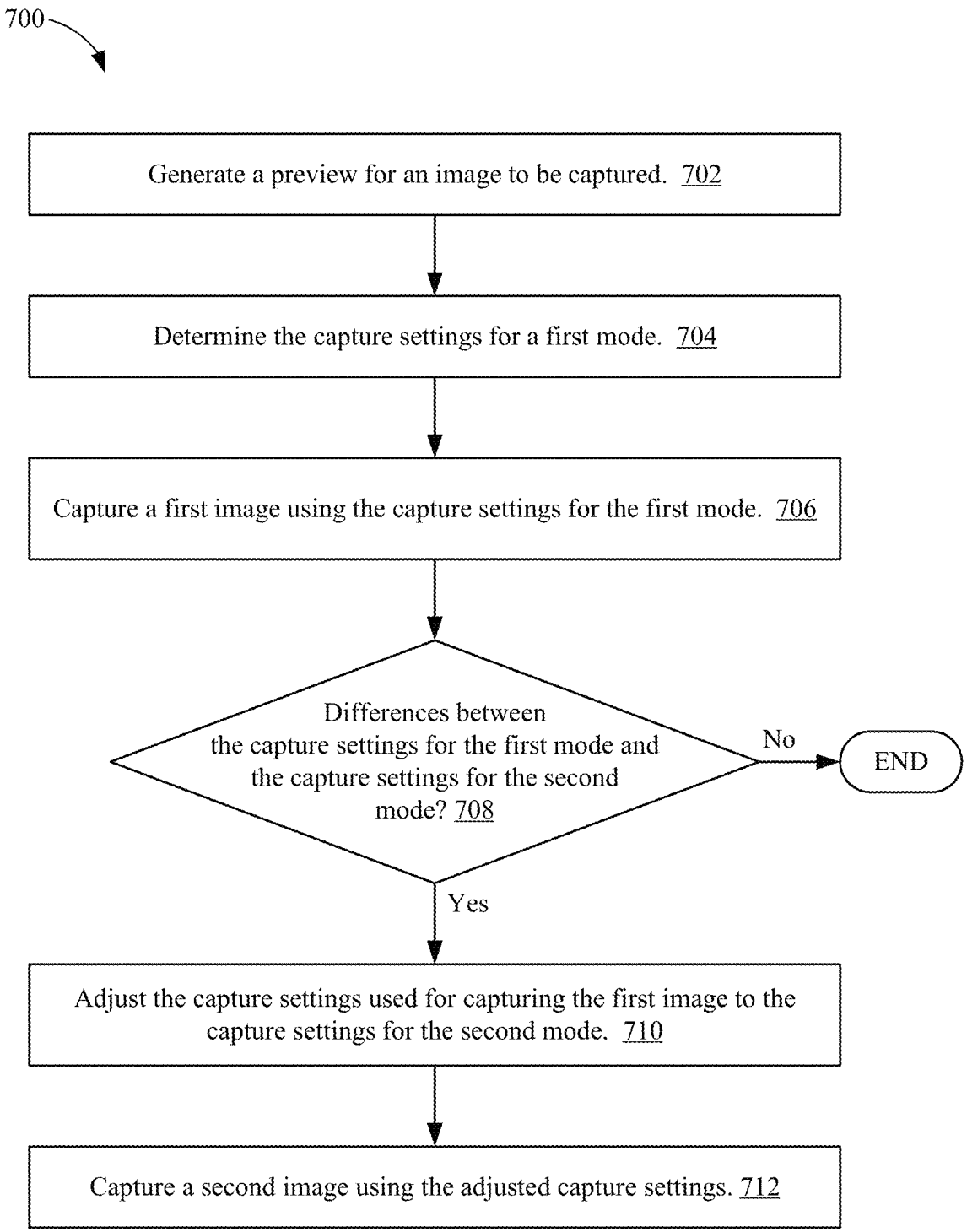
FIG. 7 is an illustrative flow chart depicting an example operation for sequentially capturing a first image using capture settings for a first mode and capturing a second image using capture settings for a second mode.
Figure 8:
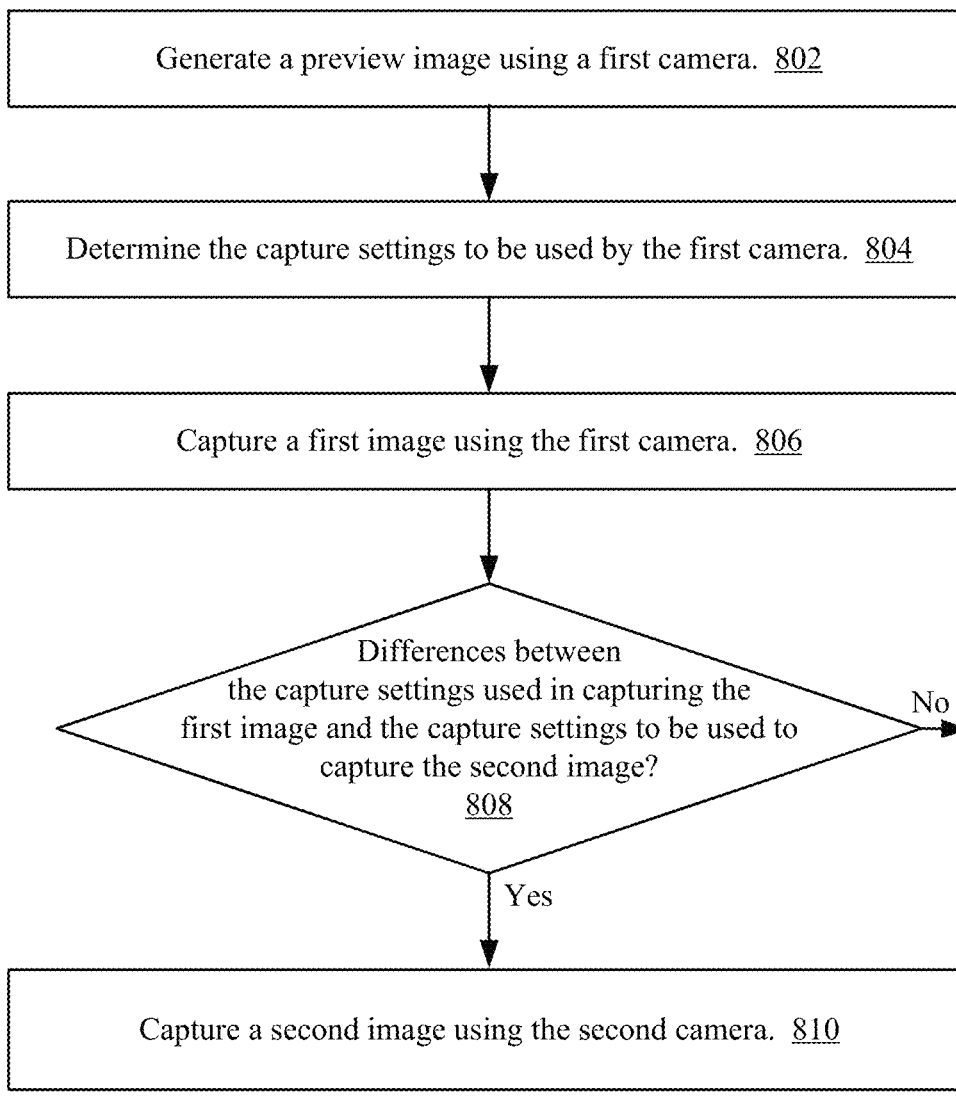
FIG. 8 is an illustrative flow chart depicting an example operation for using different cameras to capture a first image using capture settings for the first mode and to capture a second image using capture settings for the second mode.
Figure 12:
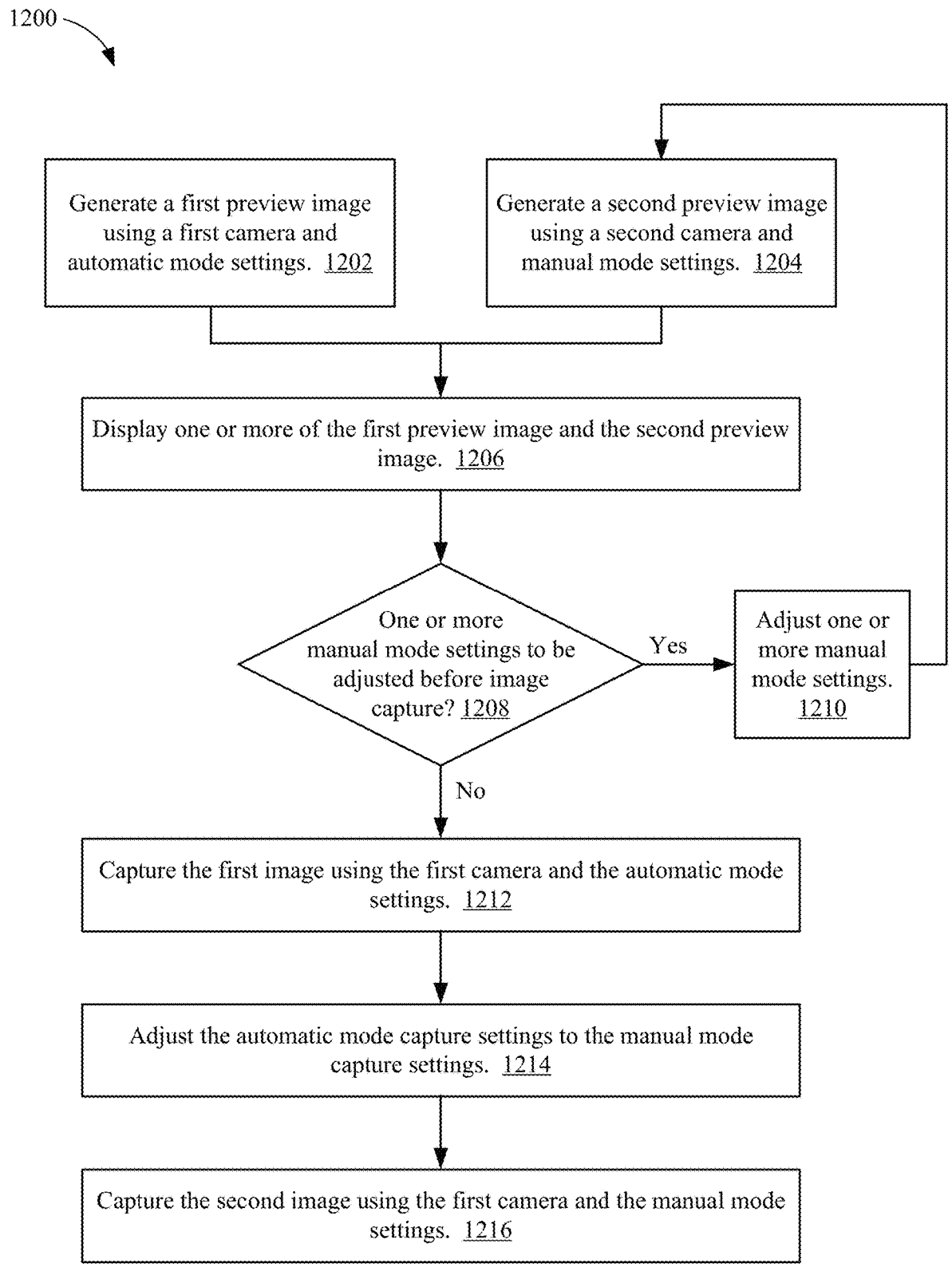
FIG. 12 is an illustrative flow chart depicting an example operation for generating multiple previews using multiple cameras and capturing multiple images using one camera.

The example processes of FIG. 7 and FIG. 8 illustrate examples for generating and using one preview when capturing an image using manual mode capture settings and capturing another image using automatic mode capture settings. The example process of FIG. 12 illustrates an example for generating and using multiple previews when capturing an image using manual mode capture settings and capturing another image using automatic mode capture settings. In the following examples, the automatic mode capture settings may be the capture settings that would be applied by a device if none of the capture settings are manually adjusted. The manual mode capture settings may be the capture settings after any manual adjustments by a user.

FIG. 7 is an illustrative flow chart depicting an example operation 700 for a device to use one camera to sequentially capture a first image using capture settings for a first mode and to capture a second image using capture settings for a second mode. In some example implementations, a device (such as the example device 400 of FIG. 4 or the example device 500 of FIG. 5) may use a camera to generate a preview for an image to be captured (702). The preview image may be presented to a user (such as on the display 416 of the device 400 of FIG. 4 or on the display 516 of the device 500 of FIG. 5). For example, an initial preview may be generated using initial capture settings determined by the device. A user may manually adjust one or more of the initial capture settings, which may adjust the preview.

The device may determine the capture settings for a first mode, where the first mode may be either the automatic mode or the manual mode (704). In some example implementations, if the capture settings for generating the preview are closer to the manual mode capture settings than the automatic mode capture settings, the first mode may be a manual mode. For example, if a user adjusts the capture settings which adjusts the preview, the capture settings for generating the preview may be the same as the manual mode capture settings. In this manner, the first mode may be the manual mode. Alternatively, if the preview is not adjusted when adjusting one or more capture settings, or if the capture settings for generating the preview is the same as the automatic mode capture settings, the first mode may be the automatic mode. In this manner, the adjustments to the capture settings before capturing a first image may be reduced to reduce latency or power consumption.

If the capture settings for generating the preview are to be adjusted for capturing the first image, the device may adjust the capture settings (not shown). With the capture settings being set for a first mode, the device may capture the first image (706). If the first mode is an automatic mode, the device captures a first image using the automatic mode capture settings. If the first mode is a manual mode, the device captures a first image using the manual mode capture settings.

If the capture settings for first mode are the same as the capture settings for the second mode (708), the device may capture only one image, and the operation 700 ends. For example, if the automatic mode capture settings are used to generate a preview, and the automatic mode capture settings are the same as the manual mode capture settings, the device may capture one image since there is no difference in capturing images using the automatic mode capture settings or the manual mode capture settings. If one or more of the capture settings for the first mode are different from the corresponding capture settings for the second mode, the device may adjust the capture settings used for capturing the first image to the capture settings for the second mode (710). The device may then capture a second image using the adjusted capture settings (712). For example, if the automatic mode capture settings are used to generate a preview, or the device adjusts the capture settings for the preview image to the automatic mode capture settings for capturing a first image, the device may capture the first image using the automatic mode capture settings. The device may then adjust the used capture settings to the manual mode capture settings and capture another image using the adjusted capture settings. In another example, if the manual mode capture settings are used to generate a preview, or the device adjusts the capture settings for the preview image to the manual mode capture settings for capturing a first image, the device may capture the first image using the manual mode capture settings. The device may then adjust the used capture settings to the automatic mode capture settings and capture another image using the adjusted capture settings.

In some example implementations, if capture settings for generating the preview image are different than the capture settings used in capturing the second image (712), the device may revert the capture settings to the previous capture settings used to generate the preview image (not shown) so that the device may generate another preview image. In some other example implementations, the last used capture settings may be used to generate the preview images after capturing the second image. In further example implementations, the user may select between the capture settings used in capturing the first image, the second image, and/or the preview image in order for a device to determine the capture settings for generating a preview image after capturing the second image.

A device may use different cameras to capture the first and second images. FIG. 8 is an illustrative flow chart depicting an example operation 800 for a device to use two cameras to capture a first image using capture settings for a first mode and to capture a second image using capture settings for a second mode. The first image may correspond to a manual mode or an automatic mode, with the second image corresponding to the other mode. If the device has two or more cameras (such as a dual camera module), a first camera (such as the first camera 502 of the device 500 of FIG. 5) may be a primary camera, and a second camera (such as the second camera 504 of the device 500 of FIG. 5) may be an auxiliary camera. The primary camera may be used to generate the preview image and to capture a first image, and the auxiliary camera may be used to assist the primary camera as well as to capture a second image. For example, the auxiliary camera may be used to set or adjust the focus of the primary camera, to provide more depth or detail in low light situations, and so on.

In some example implementations, a first camera may be used to generate a preview image (802). The device may also determine the capture settings to be used by the first camera for capturing a first image (804). If the capture settings for capturing a first image are the same as the capture settings used to generate the preview image, the device may capture the first image using the first camera without adjusting the capture settings (806). If the capture settings for capturing a first image are different than the capture settings used to generate the preview image, the device may adjust the capture settings for the first camera (not shown), and capture the first image using the adjusted capture settings (806). If the capture settings used to capture the first image are the same as the capture settings to be used to capture the second image (808), the device may capture only one image using the first camera, and may not use the second camera to capture an image (and the operation 800 ends). Thus, similar to the above description of using one camera to capture multiple images, the device may process a first instance of the captured image using manual mode processing settings and may process a second instance of the captured image using automatic mode processing settings. For example, if the automatic mode capture settings are used to generate a preview, and the automatic mode capture settings are the same as the manual mode capture settings, the device may use the first camera to capture one image without using the second camera, and the device may process multiple instances of the image captured by the first camera.

If one or more of the capture settings used in capturing the first image are different than the one or more capture settings to be used in capturing the second image, the device may use the second camera to capture the second image (810). In this manner, the capture settings for the first camera may not need to be adjusted. For example, if the automatic mode capture settings are used to generate a preview, and the automatic mode capture settings are different from the manual mode capture settings, the device may capture an image using the first camera already set with the automatic mode capture settings. The device may capture another image using the second camera set with the manual mode capture settings (without adjusting the capture settings for the first camera used to generate the preview). Similarly, if the manual mode capture settings are used to generate a preview, the device may capture an image using the first camera already set with the manual mode capture settings (without adjusting the capture settings for the first camera used to generate the preview).

In some example implementations, a camera may be specific to an automatic mode or a manual mode for capturing images. For example, a primary camera may capture an image using the automatic mode capture settings while an auxiliary camera may capture an image using the manual mode capture settings. In some other example implementations, the device may use any camera for automatic mode or for manual mode. In this manner, for example, a camera used to capture a preview may have the capture settings adjusted to a manual mode or an automatic mode based on whether the capture settings to capture the preview or closer to the automatic mode capture settings or the manual mode capture settings (to reduce latency when adjusting the settings).

While FIG. 8 depicts steps 806, 808, and 810 as being performed sequentially, the steps 806, 808, and 810 of FIG. 8 may be performed concurrently (in parallel), or may be performed in a different order than depicted. For example, a first camera may be initialized using a first set of capture settings independently from a second camera being initialized using a second set of capture settings. Additionally, or alternatively, the first camera and the second camera may capture the first image and the second image concurrently or sequentially. If the images are captured sequentially, the images may be captured in any order.

In addition, or in the alternative, one or more processing settings used to process the captured images may differ between an automatic mode and a manual mode. In one example, a user may select a different color balance or white balance setting than would be automatically determined by the device. In another example, a user may select a different noise factor for denoising than would be automatically determined by the device.

In some example implementations, the processing settings may be selected before capturing the one or more images. The device thus proceeds with processing an image using the determined processing settings. In some other example implementations, the processing settings may be selected after capturing the one or more images. For example, an image may be displayed that is captured using the manual mode capture settings but processed using the automatic mode processing settings. The user may then adjust one or more of the processing settings (such as color balance or noise factor), and the device updates the processed image for the adjusted processing settings. When the user is finished adjusting the processing settings, the device may receive an input from the user to save the image processed using the final adjusted processing settings.

If one or more processing settings are adjusted during a preview, the generated preview may be adjusted to reflect the changes. For example, if a digital zoom setting is adjusted, the preview may show the effect of the adjusted digital zoom. In another example, a change in the color balance setting may be reflected in a tint of the preview image. Alternatively, some processing settings may not impact the generated preview. For example, if a noise reduction filter is not implemented when generating a preview, changes to the noise reduction setting may not be reflected in the preview. In some other example implementations, changes to the processing settings may not be used by the device to update the preview image. In this manner, the processing settings for generating a preview may be automatic mode processing settings, manual mode processing settings, a combination of automatic mode and manual mode processing settings, or a group of processing settings unrelated to a manual mode or an automatic mode.

In some example implementations, a camera controller (such as the camera controller 412 of FIG. 4 or the camera controller 512 of FIG. 5) may process the captured images using the processing settings. For example, one or more image signal processors (such as the image signal processor 414 of FIG. 4 or the image signal processor 514 of FIG. 5) may process the multiple images. In one example, an image processed using the manual mode processing settings and an image processed using the automatic mode processing settings may have the same filters applied as an image processed using the processing settings for generating a preview image (such as a denoising filter, edge enhancement filter, color balance filter, and so on), and the inputs or criteria for the one or more filters may differ between the two modes. In another example, the preview image may have less filters applied than for the automatic mode and the manual mode. For example, a denoising filter and an edge enhancement filter may not be applied while a gamma correction filter is applied to generate a preview image.

Figure 9:
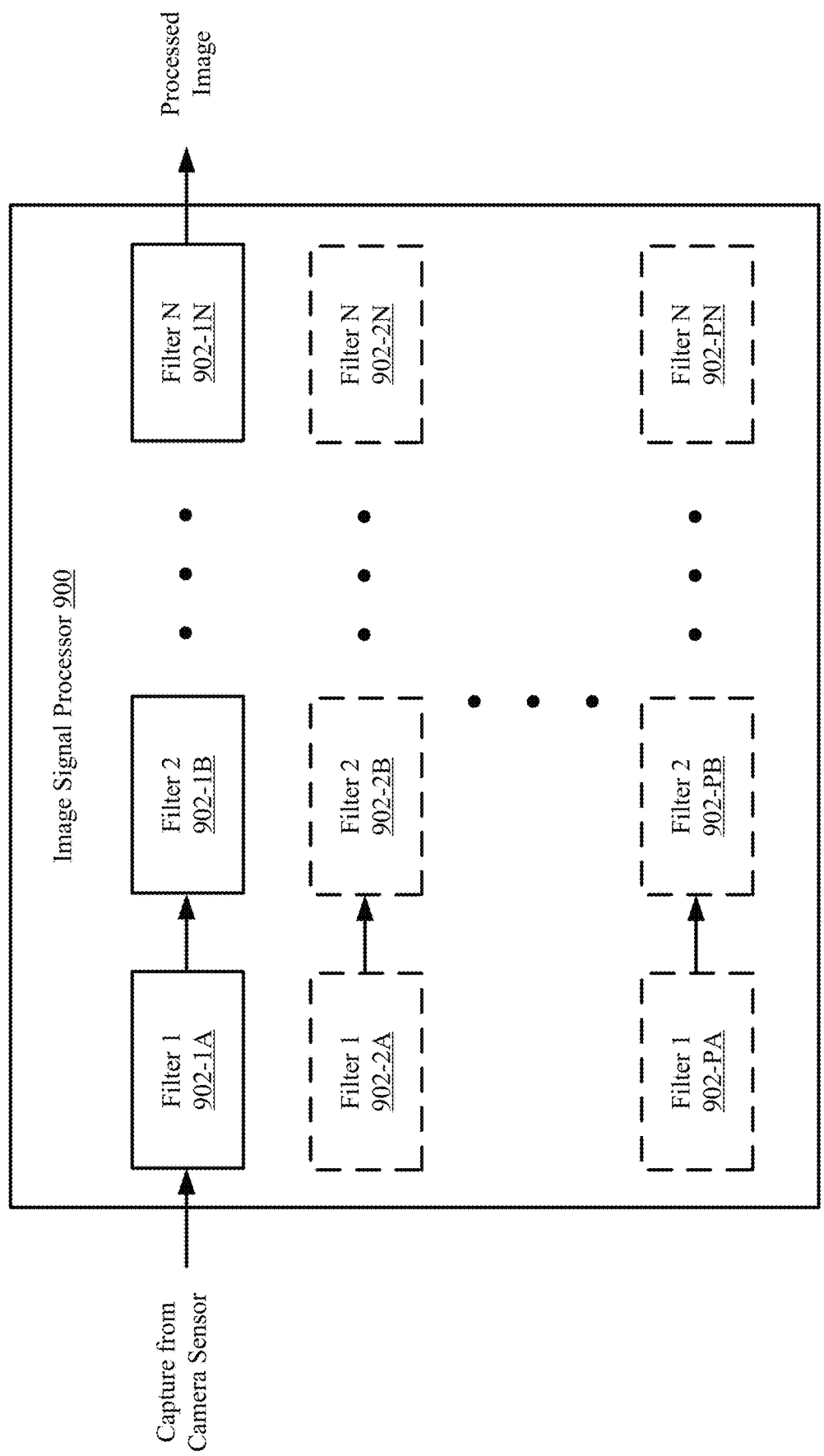
FIG. 9 is a block diagram of an example image signal processor.

FIG. 9 is a block diagram of an example image signal processor 900. The image signal processor 900 may be an example implementation of the image signal processor 414 of FIG. 4 or the image signal processor 514 of FIG. 5. As shown in FIG. 9, the image signal processor 900 may include a plurality of filters (such as Filter 1 902-1A, Filter 2 902-1B, through Filter N 902-1N) to be applied to a captured image provided by a camera sensor (such as from the camera 402 of FIG. 4, the first camera 502 of FIG. 5, or the first camera 504 of FIG. 5). If the image signal processor 900 is a multi-thread processor, the image signal processor 900 may include a group of filters for each thread. For example, the group of filters for a second thread may include Filter 1 902-2A, Filter 2 902-2B, through Filter N 902-2N. If the image signal processor 900 includes P number of threads, the P$^{th}$ thread may include Filter 1 902-PA, Filter 2 902-PB, through Filter N 902-PN. Alternatively, the image signal processor 900 may be a single thread processor. In some example implementations, Filter 1 (902-1A, 902-2A, and 902-PA) may be a noise reduction filter, Filter 2 (902-1B, 902-2B, and 902-PB) may be an edge enhancement filter, and Filter N (902-1N, 902-2N, and 902-PN) may be a final filter to complete processing the captured image.

In some example implementations, the same filter of different threads may use different settings for processing a captured image. For example, the noise reduction filter 902-1A of a first thread may use a different noise factor than the noise reduction filter 902-2A of a second thread. In this manner, different captured images (or different instances of the same captured image) may be processed using different processing settings. Additionally, or alternatively, multiple processors may be used to process multiple captured images (or multiple instances of the same captured image) using different processing settings.

Figure 10:
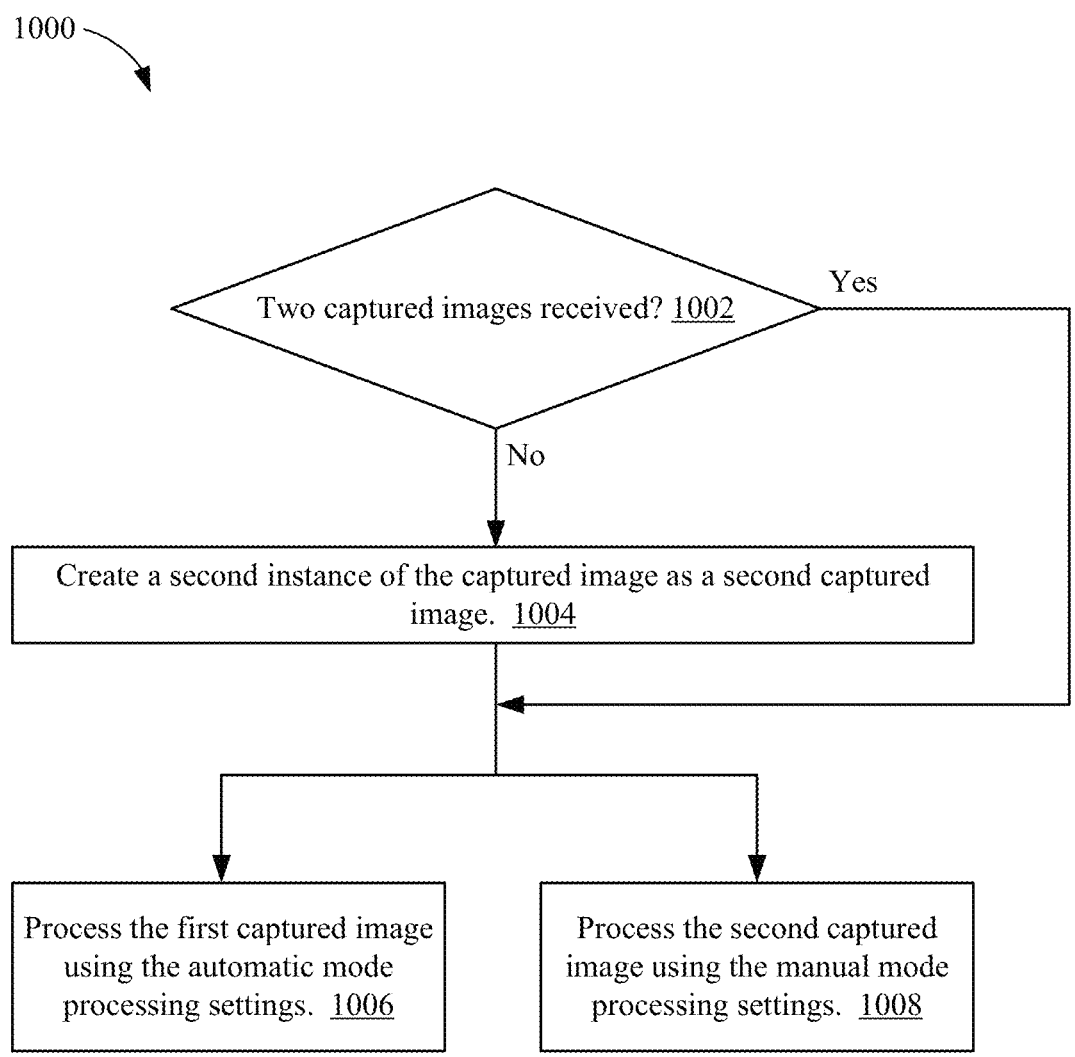
FIG. 10 is an illustrative flow chart depicting an example operation for processing images captured using one or more different automatic mode processing settings and one or more manual mode processing settings.

FIG. 10 is an illustrative flow chart depicting an example operation 1000 for processing captured images using one or more different automatic mode processing settings and corresponding manual mode processing settings. The example operation 1000 is described below with respect to the image signal processor 900 of FIG. 9 and regarding processing settings that may be manually adjusted before image capture. However, multiple or different processors or other configurations of a camera controller or processor (such as a separate image signal processer for each camera) may be used, and different timings for adjusting the processing settings (such as before or after image capture) may occur, in performing the example operation 1000.

Two captured images may be received by the image signal processor 900. For example, if one camera is used to capture an image using the automatic mode capture settings and capture another image using the manual mode capture settings, the two images may be provided sequentially to the image signal processor 900 in the order they are captured. If multiple cameras are used to capture the two images, the images may be provided concurrently or sequentially to the image signal processor 900, based on when the images are captured. If two captured images are received by the image signal processor 900 (1002), then different capture settings may have been used for capturing the two images. In this manner, an image captured using the automatic mode capture settings may be processed using the automatic mode processing settings, and an image captured using the manual mode capture settings may be processed using the manual mode processing settings.

Conversely, if two captured images are not received by the image signal processor 900 (1002), then the automatic mode capture settings may be the same as the manual mode capture settings (with only one image being captured for the capture settings). To apply different manual mode processing settings and automatic manual mode processing settings to one captured image, the image signal processor 900 (or other component, such as the camera) may create a second instance of the captured image to be used as a second captured image (1004). For example, the image signal processor 900 may duplicate a first captured image to create a second captured image that is the same as the first captured image.

The image signal processor 900 may then process the first captured image using the automatic mode processing settings (1006). The image signal processor 900 may also process the second captured image using the manual mode processing settings (1008). For example, if the processing settings are the same between the manual mode and the automatic mode except for a gamma correction, the image signal processor 900 may apply the same filters with the same settings for both images except for the gamma correction filter. In this manner, the image signal processor 900 may apply the gamma correction filter with different settings to the first captured image and the second captured image. In one example implementation, the image signal processor 900 may use one thread with the automatic mode processing settings to process the first captured image, and may use a different thread with the manual mode settings to process the second captured image. In another example implementation, the image signal processor 900 may use one thread (such as filters 902-1A through 902-1N) to process both the first captured image and the second captured image. For example, the image signal processor 900 may first use the filters of the first thread with the automatic mode processing settings to process the first captured image, and may then adjust one or more filters using the manual mode processing settings and process the second image capture using the filters of the same thread with the manual mode processing settings.

Generating a preview for the automatic mode settings and generating a separate preview for the manual mode settings may assist a user in deciding whether to continue in a manual mode (thus using the manual mode capture and processing settings) or switch to an automatic mode (thus using only the automatic mode capture and processing settings). As previously illustrated, the previews may be concurrently displayed, or the device may switch between displaying the previews. In this manner, the preview for the manual mode settings may be adjusted as one or more settings are adjusted, and the adjusted preview image may be compared to the preview image for the automatic mode.

FIG. 12 is an illustrative flow chart depicting an example operation 1200 for generating multiple preview images using multiple cameras (such as cameras 502 and 504 of FIG. 5) and capturing multiple images using one camera (such as camera 502 of FIG. 5). A device may generate a first preview image using a first camera (such as a primary camera) and the automatic mode settings (1202). For example, a primary camera configured with the automatic mode capture settings and an image signal processor thread configured with the automatic mode processing settings may be used to generate a preview image for the automatic mode settings. A device also may generate a second preview image using a second camera (such as an auxiliary camera) and the manual mode settings (1204). For example, an auxiliary camera configured with the manual mode capture settings and an image signal processor thread configured with the manual mode processing settings may be used to generate a preview image for the manual mode settings. With two preview images being generated for the different mode settings, one or more of the preview images may be displayed (1206). For example, a display may present a side-by-side view of the preview images, a picture-in-picture view of the preview images, switch between presenting the first preview image and the second preview image, and so on.

A user may determine that one or more manual mode settings are to be adjusted before an image is captured. In response, a device may receive one or more user inputs to adjust the manual mode settings. For example, a display may present the view 1100 of FIG. 11A to a user, and the user may identify that the exposure value for the image 102 is too low. As a result, the user may provide one or more user inputs to adjust the exposure value.

If one or more manual mode settings are to be adjusted before capturing an image (1208), the one or more manual mode settings are adjusted (1210). The preview for image the manual mode settings is then generated using the adjusted manual mode settings (1204). If the manual mode settings are not to be adjusted before capturing an image (1208), a first image may be captured using the first camera and the automatic mode settings (1212). After capturing the first image (1212), the automatic mode capture settings may be adjusted to the manual mode capture settings for the first camera (1214). The second image may then be captured using the first camera and the manual mode settings (1216).

In the alternative, the camera to capture the first image and the second image may have the manual mode settings applied. In this manner, the device may first capture an image using the manual mode capture settings, adjust the capture settings for the camera to the automatic mode capture settings, and capture another image using the automatic mode capture settings.

One or more processors (such as the image signal processor 900 of FIG. 9) may process concurrently or in sequence the first image capture and the second image capture. In some example implementations, the first image capture may be processed using automatic mode processing settings, and the second image capture may be processed using manual mode processing settings. If the automatic mode processing settings are the same as the manual mode processing settings, the one or more processors may use the same processing settings to process the two captured images.

The techniques described herein may be implemented in hardware, software, firmware, or any combination thereof, unless specifically described as being implemented in a specific manner. For example, the described various processes and determinations may be implemented as specialty or integrated circuits in an image signal processor, as software (such as the instructions 410 of FIG. 4 or the instructions 510 of FIG. 5) to be executed by the image signal processor 414 or by the image signal processor 514 (which may be one or more image signal processors) of the camera controller 412 or the camera controller 512, respectively, or one of the processor 406 or the processor 506, respectively (which may be one or more processors), or as firmware. Any features described may also be implemented together in an integrated logic device or separately as discrete but interoperable logic devices. If implemented in software, the techniques may be realized at least in part by a non-transitory processor-readable storage medium (such as the memory 408 of FIG. 4 or the memory 508 of FIG. 5) comprising instructions (such as the instructions 410 or the instructions 510 or other instructions accessible by one or more image signal processors 414 or image signal processors 514) that, when executed by one or more processors (such as the processor 406 or the processor 506 or one or more image signal processors in the camera controller 412 or the camera controller 512), performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 406 or the image signal processor 414 in FIG. 4 or the processor 506 or the image signal processor 514 in FIG. 5. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, example capture and processing settings are provided, but other processing or capture settings may be used. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples, and any means for performing the functionality described herein are included in aspects of the disclosure.

What is claimed is:

1. A device configured to operate in a manual mode for image or video capture, comprising:
one or more processors; and
a memory storing instructions that, when executed by the one or more processors, cause the device to:
determine one or more capture settings for an automatic mode;
generate a first preview image using the one or more capture settings for the automatic mode;
determine one or more capture settings for the manual mode;
generate a second preview image using the one or more capture settings for the manual mode, wherein at least one characteristic for the second preview image is the same as the at least one characteristic for the first preview image based on a type of at least one capture setting from the one or more capture settings for the manual mode;
generate a first image frame of a scene using the one or more capture settings for the manual mode;
if the one or more capture settings for the automatic mode are different than the one or more capture settings for the manual mode, then generate a second image frame of the scene using the one or more capture settings for the automatic mode;
process the generated first image frame using manual mode processing settings; and
process the generated second image frame using automatic mode processing settings;
wherein the one or more capture settings for the automatic mode and the one or more capture settings for the manual mode include one or more of a zoom setting, a flash brightness, a flash duration, and a flash color.

2. The device of claim 1, wherein execution of the instructions further causes the device to:
capture the first image frame using the one or more capture settings for the manual mode; and
capture the second image frame using the one or more capture settings for the automatic.

3. The device of claim 2, further comprising a first camera configured to:
capture the first image frame using the one or more capture settings for the manual mode; and
capture the second image frame using the one or more capture settings for the automatic mode.

4. The device of claim 3, wherein execution of the instructions further causes the device to:
generate the first preview image before capturing the first image frame and the second image frame; and
adjust one or more capture settings between capturing the first and the second image frames.

5. The device of claim 4, wherein execution of the instructions further causes the device to:
generate the second preview image before capturing the first image frame and the second image frame.

6. The device of claim 4, wherein execution of the instructions further causes the device to:
adjust one or more manual mode capture settings in response to a user input; and
after adjusting the one or more manual mode capture settings, generate a third preview image using the adjusted one or more manual mode capture settings.

7. The device of claim 4, further comprising a display, wherein execution of the instructions further causes the device to:
present on the display the first preview image and the second preview image.

8. The device of claim 4, wherein execution of the instructions for presenting causes the device to:
concurrently present the first preview image and the second preview image on the display.

9. The device of claim 1, wherein the one or more capture settings for the automatic mode and the one or more capture settings for the manual mode include the zoom setting.

10. A method for image or video capture using a device operating in a manual mode, comprising:
determining one or more capture settings for an automatic mode;
generating a first preview image using the one or more capture settings for the automatic mode;
determining one or more capture settings for the manual mode;
generating a second preview image using the one or more capture settings for the manual mode, wherein at least one characteristic for the second preview image is the same as the at least one characteristic for the first preview image based on a type of at least one capture setting from the one or more capture settings for the manual mode;
generating a first image frame of a scene using the one or more capture settings for the manual mode;
if the one or more capture settings for the automatic mode are different than the one or more capture settings for the manual mode, then generating a second image frame of the scene using the one or more capture settings for the automatic mode;

processing the generated first image frame using manual mode processing settings; and processing the generated second image frame using automatic mode processing settings;

wherein the one or more capture settings for the automatic mode and the one or more capture settings for the manual mode include one or more of a zoom setting, a flash brightness, a flash duration, and a flash color.

11. The method of claim 10, further comprising:

capturing the first image frame using the one or more capture settings for the manual mode; and capturing the second image frame using the one or more capture settings for the automatic mode.

12. The method of claim 11, further comprising:

capturing, with a first camera, the first image frame using the one or more capture settings for the manual mode; and capturing, with the first camera, the second image frame using the one or more capture settings for the automatic mode.

13. The method of claim 12, further comprising:

generating the first preview image before capturing the first image frame and the second image frame; and adjusting capture settings between capturing the first and the second image frames.

14. The method of claim 13, further comprising:

generating the second preview image before capturing the first image frame and the second image frame;

adjusting one or more manual mode capture settings in response to a user input;

after adjusting the one or more manual mode capture settings, generating a third preview image using the adjusted one or more manual mode capture settings; and presenting, on a display of the device, the first preview image and the second preview image.

15. The method of claim 10, wherein the one or more capture settings for the automatic mode and the one or more capture settings for the manual mode include the zoom setting.

16. A non-transitory computer-readable storage medium comprising instructions that, when executed by one or more processors of a device configured to operate in a manual mode, cause the device to perform a number of operations comprising:

determining one or more capture settings for an automatic mode;

generating a first preview image using the one or more capture settings for the automatic mode;

determining one or more capture settings for the manual mode;

generating a second preview image using the one or more capture settings for the manual mode, wherein at least one characteristic for the second preview image is the same as the at least one characteristic for the first preview image based on a type of at least one capture setting from the one or more capture settings for the manual mode;

generating a first image frame of a scene using the one or more capture settings for the manual mode;

if the one or more capture settings for the automatic mode are different than the one or more capture settings for the manual mode, then generating a second image frame of the scene using the one or more capture settings for the automatic mode;

processing the generated first image frame using manual mode processing settings; and processing the generated second image frame using automatic mode processing settings;

wherein the one or more capture settings for the automatic mode and the one or more capture settings for the manual mode include one or more of a zoom setting, a flash brightness, a flash duration, and a flash color.

17. The non-transitory computer-readable storage medium of claim 16, wherein execution of the instructions causes the device to perform operations further comprising:

capturing the first image frame using the one or more capture settings for the manual mode; and capturing the second image frame using the one or more capture settings for the automatic mode.

18. The non-transitory computer-readable storage medium of claim 17, wherein execution of the instructions causes the device to perform operations further comprising:

generating the first preview image using a first camera and the one or more capture settings for the automatic mode before capturing the first image frame and the second image frame using the first camera;

capturing the first image frame using the first camera and the one or more capture settings for the manual mode;

capturing the second image frame using the first camera and the one or more capture settings for the automatic mode; and adjusting capture settings between capturing the first and the second image frames.

19. The non-transitory computer-readable storage medium of claim 18, wherein execution of the instructions causes the device to perform operations further comprising:

generating the second preview image before capturing the first image frame and the second image frame;

adjusting one or more manual mode capture settings in response to a user input;

after adjusting the one or more manual mode capture settings, generating a third preview image using the adjusted one or more manual mode capture settings; and presenting, on a display of the device, the first preview image and the second preview image.

20. The non-transitory computer-readable storage medium of claim 16, wherein the one or more capture settings for the automatic mode and the one or more capture settings for the manual mode include the zoom setting.

21. A device configured to operate in a manual mode, comprising:

means for determining one or more capture settings for an automatic mode;

means for generating a first preview image using the one or more capture settings for the automatic mode;

means for determining one or more capture settings for the manual mode;

means for generating a second preview image using the one or more capture settings for the manual mode, wherein at least one characteristic for the second preview image is the same as the at least one characteristic for the first preview image based on a type of at least one capture setting from the one or more capture settings for the manual mode;

means for generating a first image frame of a scene using the one or more capture settings for the manual mode;

means for generating a second image frame of the scene using the one or more capture settings for the automatic mode if the one or more capture settings for the automatic mode are different than the one or more capture settings for the manual mode;

means for processing the generated first image frame using manual mode processing settings of the manual mode settings; and means for processing the generated second image frame using automatic mode processing settings of the automatic mode settings;

wherein the one or more capture settings for the automatic mode and the one or more capture settings for the manual mode include one or more of a zoom setting, a flash brightness, a flash duration, and a flash color.

22. The device of claim 21, further comprising:

means for capturing the first image frame using the one or more capture settings for the manual mode; and means for capturing the second image frame using the one or more capture settings for the automatic mode.

23. The device of claim 21, wherein the one or more capture settings for the automatic mode and the one or more capture settings for the manual mode include the zoom setting.

\* \* \* \* \*